(12) United States Patent
Holgersson

(10) Patent No.: US 11,528,842 B2
(45) Date of Patent: Dec. 20, 2022

(54) ROBOTIC WORKING TOOL AND WORK AREA BOUNDARY SENSING METHOD

(71) Applicant: HUSQVARNA AB, Huskvarna (SE)

(72) Inventor: Jonas Holgersson, Huskvarna (SE)

(73) Assignee: HUSQVARNA AB, Huskvarna (SE)

( * ) Notice: Subject to any disclaimer, the term of this patent is extended or adjusted under 35 U.S.C. 154(b) by 267 days.

(21) Appl. No.: 16/772,510

(22) PCT Filed: Dec. 4, 2018

(86) PCT No.: PCT/SE2018/051244
§ 371 (c)(1),
(2) Date: Jun. 12, 2020

(87) PCT Pub. No.: WO2019/117784
PCT Pub. Date: Jun. 20, 2019

(65) Prior Publication Data
US 2020/0383265 A1    Dec. 10, 2020

(30) Foreign Application Priority Data

Dec. 14, 2017 (SE) .................................... 1751546-1

(51) Int. Cl.
*A01D 34/00* (2006.01)
*G05D 1/00* (2006.01)
(Continued)

(52) U.S. Cl.
CPC .......... *A01D 34/008* (2013.01); *G05D 1/0088* (2013.01); *G05D 1/0219* (2013.01);
(Continued)

(58) Field of Classification Search
CPC .. A01D 34/008; A01D 2101/00; A01D 34/00; A01D 34/006; G05D 1/0088;
(Continued)

(56) References Cited

U.S. PATENT DOCUMENTS

| 5,191,528 A | 3/1993 | Yardley et al. |
| 6,255,793 B1 * | 7/2001 | Peless ................. G05D 1/0227 318/580 |

(Continued)

FOREIGN PATENT DOCUMENTS

| EP | 2684438 A1 | 1/2014 |
| EP | 2939514 A1 | 11/2015 |

(Continued)

OTHER PUBLICATIONS

Swedish Search Report for Application No. 1751546-1 dated Jun. 28, 2018.

(Continued)

*Primary Examiner* — Michael J Zanelli
(74) *Attorney, Agent, or Firm* — Burr & Forman, LLP

(57) ABSTRACT

The present disclosure related to a robotic working tool 100 comprising a controller 110 and at least a first and at least a second magnetic sensor arranged to sense a magnetic signal. The controller 110 is configured to detect a first magnetic signal; determine a signal strength of the detected first magnetic signal; determine if the signal strength of the detected magnetic signal is above or below a threshold value, and if the signal strength is above the threshold value, accept signal detection input for the first magnetic signal from a first set of sensors, and if the signal strength is below the threshold value, accept signal detection input for the first magnetic signal from a second set of sensors, wherein the second set of sensors is a subset of the first set. The disclosure also relates to a method for use in the robotic working tool and a computer readable medium for carrying computer instructions that when loaded into a controller of a robotic working tool, cause the robotic working tool to operate according to a method.

14 Claims, 5 Drawing Sheets

(51) Int. Cl.
    *G05D 1/02*      (2020.01)
    *A01D 101/00*    (2006.01)
(52) U.S. Cl.
    CPC ....... *G05D 1/0265* (2013.01); *A01D 2101/00* (2013.01); *G05D 2201/0208* (2013.01)
(58) Field of Classification Search
    CPC ......... G05D 1/0265; G05D 2201/0208; G05D 1/0219; G05D 1/02
    See application file for complete search history.

(56) References Cited

U.S. PATENT DOCUMENTS

| | | | |
|---|---|---|---|
| 9,072,219 B2 * | 7/2015 | Da Rocha | A01D 34/008 |
| 2013/0184924 A1 | 7/2013 | Jagenstedt et al. | |
| 2015/0366137 A1 * | 12/2015 | Markusson | B60L 50/52 320/107 |
| 2017/0351265 A1 | 12/2017 | Eagling et al. | |

FOREIGN PATENT DOCUMENTS

| | | | | |
|---|---|---|---|---|
| WO | | 9915941 A1 | 4/1999 | |
| WO | WO-2014158060 A1 * | | 10/2014 | ........... A01D 34/008 |

OTHER PUBLICATIONS

International Search Report and Written Opinion for International Application No. PCT/SE2018/051244 dated Jan. 7, 2019.

* cited by examiner

Time graph

ROBOTIC WORKING TOOL AND WORK AREA BOUNDARY SENSING METHOD

TECHNICAL FIELD

This application relates to robotic working tools and in particular to a robotic working tool, a robotic working tool system, a computer readable medium and a method for improved work area boundary sensing by a robotic working tool, such as a lawnmower.

BACKGROUND

Automated or robotic power tools such as robotic lawnmowers are becoming increasingly more popular. In robotic working tool systems, such as robotic lawnmower systems, it is an important safety aspect that the robotic working tool 100 can always sense the control signal emitted through the boundary wire 250. This is to ensure that the robotic working tool 100 is made aware of whether the control signal is active or not, so that a cut or break in the boundary may resulting in a dead and non-functioning boundary wire no longer acting as a delimiter, can be detected before the robotic working tool crosses the boundary wire.

By ensuring that the robotic working tool can always hear the control signal or rather pick up the magnetic field emitted by the control signal, the robotic working tool is also ensured to never cross a dead boundary wire, as it can stop its operation when the signal goes dead.

However, as a robotic working tool moves away from a boundary wire, the picked up signal will decrease in strength, end then be more and more influenced by interference, both external and internal. However, as more and more robotic working tools are made smaller and smaller and also arranged with added functionalities, the internal interference grows accordingly. And, as the inventors have realized, because most, if not all, contemporary robotic working tools use variable gain amplifiers for amplifying the detected signal, internal interference will have a larger impact or effect on the operation of the robotic working tool, the further away from a boundary wire the robotic working tool is. This is due to that as the signal becomes weaker, the gain of the amplifier is increased, whereby the interferences will also be amplified. Taking into account that also external interference will be likewise amplified and added to the internal interference, this may lead to erroneous determinations being made by the controller of the robotic working tool, for example leading to false zeros (determined to be dead boundary wires) or false polarity changes, indicating a crossing of a cable. Both these examples (and others) lead to the robotic working tool operating in an erratic manner.

For example, should a robotic working tool be in the middle of a work area, such as a garden lawn, and an incoming call was made to a mobile phone lying close to the robotic working tool's position, or even or a robotic working tool having wireless communication capabilities, the call may be to the robotic working tool giving new instructions. The wireless communication will introduce external interference and should this communication interference result in a false polarity change, the robotic working tool may start stopping, turning repeatedly, which would indeed be very confusing to an operator, especially if it happens as the operator is trying to provide control information, the erratic behaviour then not reflecting the control information at all.

To ensure a smooth and consistent operation, there is thus a need for a robotic working tool better equipped to handle internal interference.

SUMMARY

It is therefore an object of the teachings of this application to overcome or at least reduce those problems and problems discussed above and below by providing a robotic working tool comprising a controller and at least a first and a second magnetic sensor arranged to sense a magnetic boundary signal emitted by a boundary wire, wherein the controller is configured to select which sensor to listen to depending on the detected signal strength. This enables the robotic working tool to ignore and avoid erroneous signals that are too heavily influenced by (internal) interference and thereby avoid erratic behavior.

This is a very simple solution to a long standing problem, that in some embodiments require only a minimum of modification, such as a software upgrade, to the contemporary robotic working tools.

It is also an object of the teachings of this application to overcome the problems by providing a robotic working tool system comprising a robotic working tool according to herein.

It is also an object of the teachings of this application to overcome the problems by providing a method for use in a robotic working tool according to herein.

It is also an object of the teachings of this application to overcome the problems by providing a computer readable medium for carrying computer instructions that when loaded into a controller of a robotic working tool or robotic working tool system, causes the robotic working tool or robotic working tool system to operate according to a method as above and herein.

Other features and advantages of the disclosed embodiments will appear from the following detailed disclosure, from the attached dependent claims as well as from the drawings. Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention will be described in further detail under reference to the accompanying drawings in which.

DETAILED DESCRIPTION

The disclosed embodiments will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout.

It should be noted that even though the description given herein will be focused on robotic lawnmowers, the teachings herein may also be applied to robotic cleaners such as robotic vacuum cleaners and/or robotic floor cleaners, robotic ball collectors, robotic mine sweepers, robotic farming equipment, or other robotic working tools to be employed in a work area defined by a boundary wire.

Figure 1A:
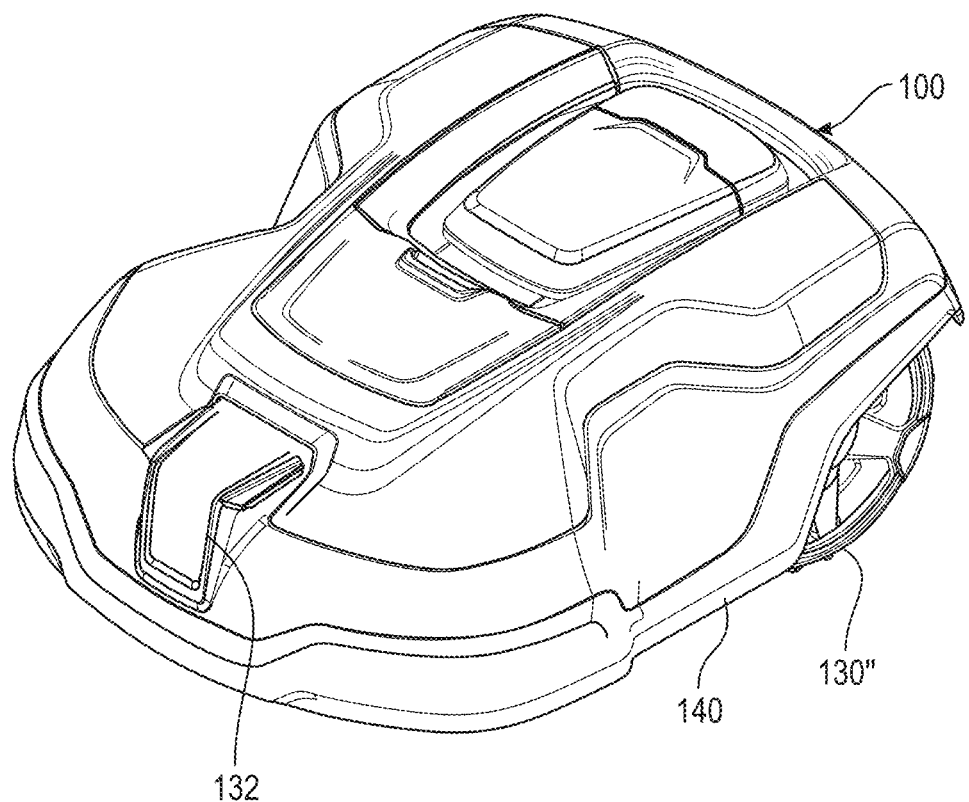
FIG. 1A shows an example of a robotic lawnmower according to an embodiment of the teachings herein.

FIG. 1A shows a perspective view of a robotic working tool 100, here exemplified by a robotic lawnmower 100, having a body comprising a cover 132 and a chassis 140 and a plurality of wheels 130 (only one shown). As can be seen, the robotic lawnmower 100 may comprise charging skids for contacting contact plates when docking into a charging station (not shown in FIG. 1A, but referenced 210 in FIG. 2) for receiving a charging current through, and possibly also for transferring information by means of electrical communication between the charging station and the robotic lawnmower 100.

Figure 1B:
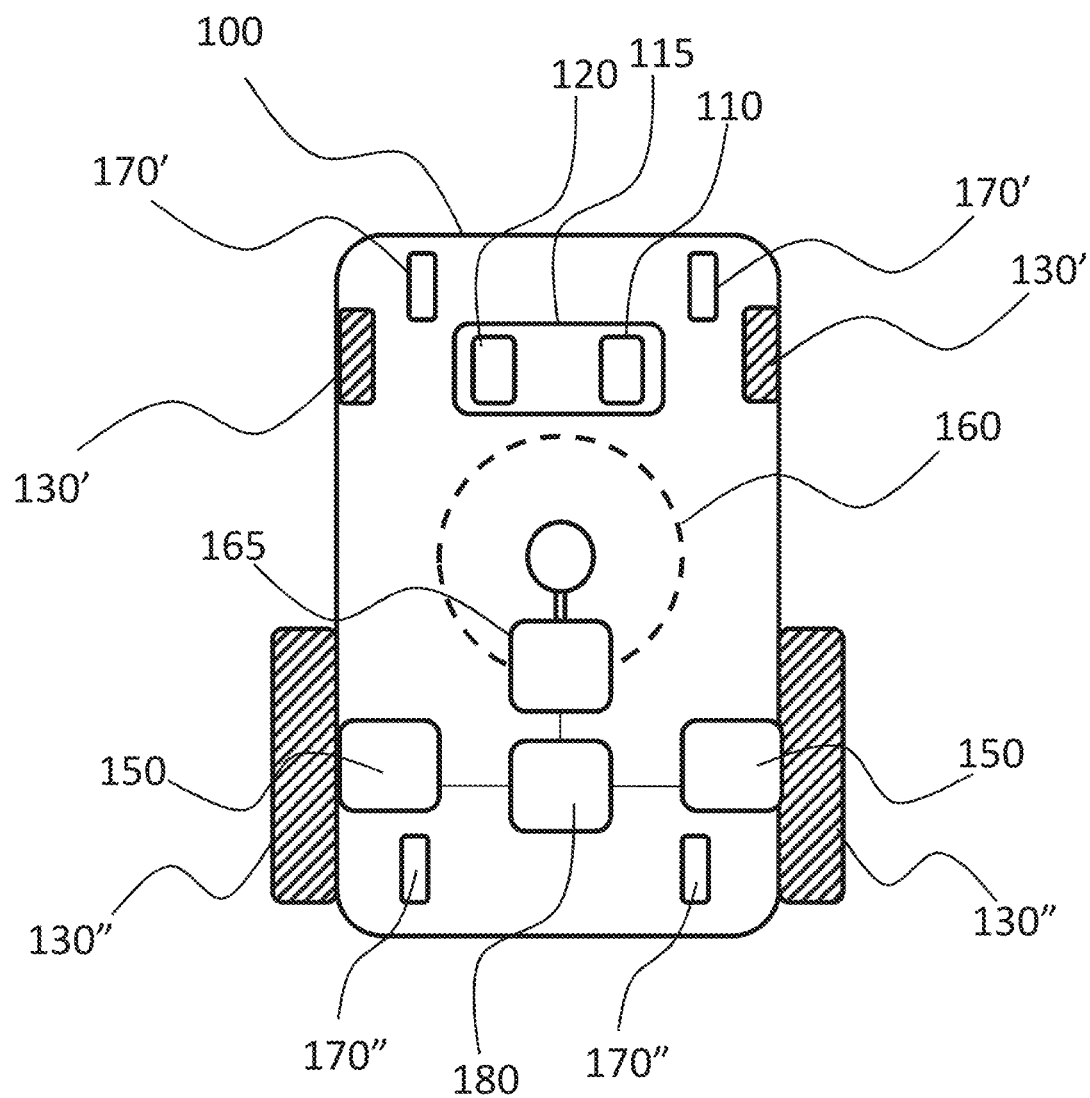
FIG. 1B shows a schematic view of the components of an example of a robotic lawnmower according to an embodiment of the teachings herein.

FIG. 1B shows a schematic overview of the robotic working tool 100, also exemplified here by a robotic lawnmower 100, having a chassis 140 and a plurality of wheels 130.

In the exemplary embodiment of FIG. 1B the robotic lawnmower 100 has 4 wheels 130, two front wheels 130' and the rear wheels 130". At least some of the wheels 130 are drivably connected to at least one electric motor 150. It should be noted that even if the description herein is focused on electric motors, combustion engines may alternatively be used possibly in combination with an electric motor.

In the example of FIG. 1B, each of the rear wheels 130" is connected to a respective electric motor 150. This allows for driving the rear wheels 130" independently of one another which, for example, enables steep turning.

The robotic lawnmower 100 also comprises a controller 110. The controller 110 may be implemented using instructions that enable hardware functionality, for example, by using executable computer program instructions in a general-purpose or special-purpose processor that may be stored on a computer readable storage medium (disk, memory etc) 120 to be executed by such a processor. The controller 110 is configured to read instructions from the memory 120 and execute these instructions to control the operation of the robotic lawnmower 100 including, but not being limited to, the propulsion of the robotic lawnmower. The controller 110 may be implemented using any suitable, publically available processor or Programmable Logic Circuit (PLC). The memory 120 may be implemented using any commonly known technology for computer-readable memories such as ROM, RAM, SRAM, DRAM, FLASH, DDR, SDRAM or some other memory technology. The controller 110 and the memory may be placed on one and the same printed circuit board 115, which may also house other components such as Global Positioning System devices and wireless communication interfaces to mention a few examples.

Figure 2:
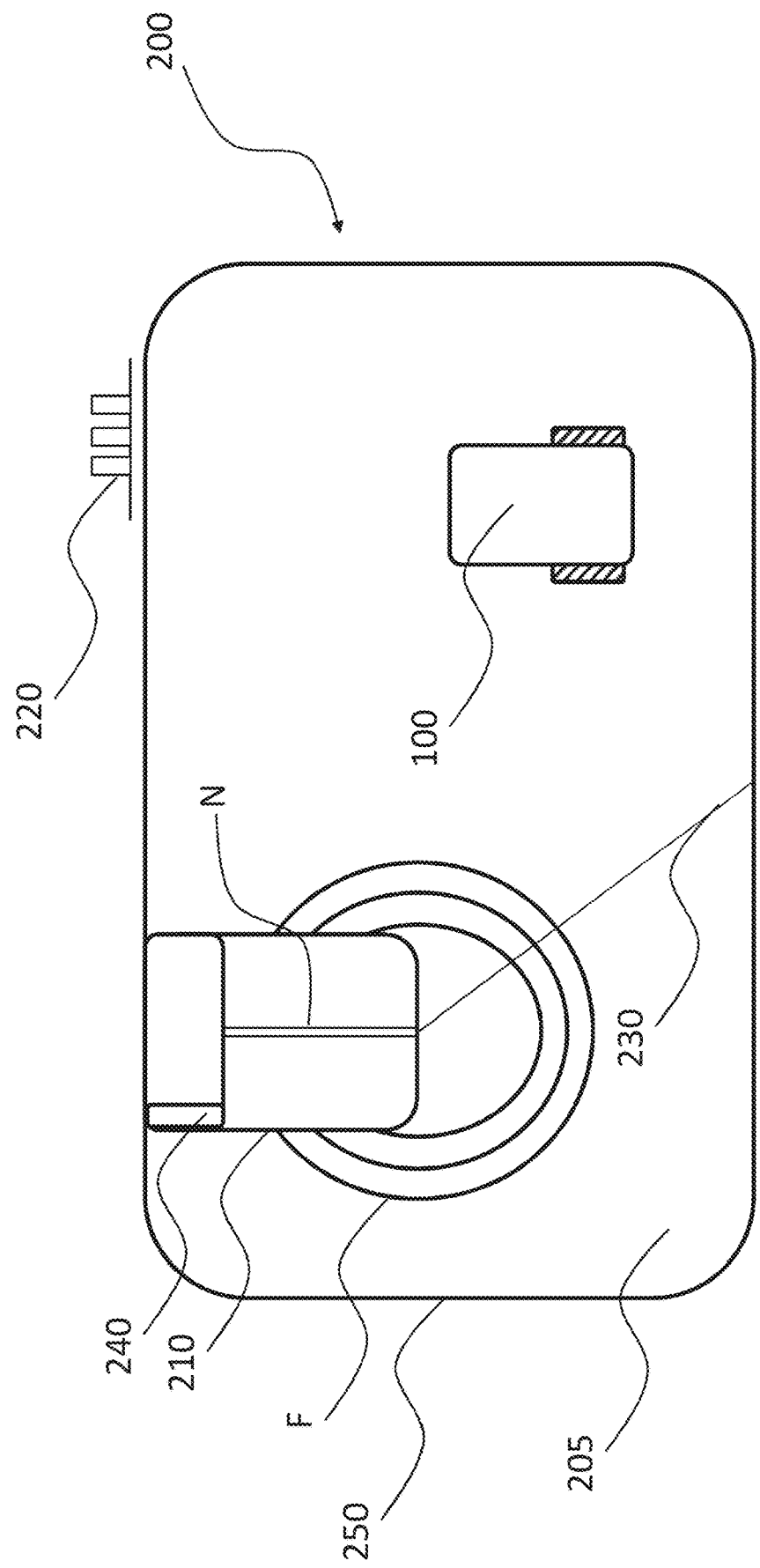
FIG. 2 shows a schematic overview of a robotic lawnmower system according to an embodiment of the teachings herein.

The robotic lawnmower 100 further has at least one sensor 170; in the example of FIG. 1B there are four sensors divided into a front or first sensor pair 170' and a rear or second sensor pair 170", respectively arranged at each wheel 130', 130" to detect a magnetic field (not shown) and for detecting a boundary wire and/or for receiving (and possibly also sending) information from a signal generator (referenced 240 in FIG. 2). The sensors 170 may thus be arranged as at least one front sensor 170' and at least one rear sensor 170". In some embodiments, the sensors 170 may be connected to the controller 110, and the controller 110 may be configured to process and evaluate any signals received from the sensors 170. The sensor signals may be caused by the magnetic field being generated by a control signal being transmitted through a boundary wire. This enables the controller 110 to determine whether the robotic lawnmower 100 is close to or crossing a boundary wire 250, or inside or outside an area enclosed by the boundary wire 250. This also enables the robotic lawnmower 100 to receive, and possibly send, information from/to the control signal 245.

In an embodiment where the robotic working tool 100 has (at least) a front sensor 170' and (at least) a rear sensor 170", the sensors may be used to detect a partial crossing of the boundary wire, such as when only one of the (at least) two sensors detects a polarity switch.

The robotic lawnmower 100 also comprises a grass cutting device 160, such as a rotating blade 160 driven by a cutter motor 165. The grass cutting device being an example of a work tool 160 for a robotic working tool 100. The cutter motor 165 is connected to the controller 110 which enables the controller 110 to control the operation of the cutter motor 165. The controller may also be configured to determine the load exerted on the rotating blade, by for example measure the power delivered to the cutter motor 165 or by measuring the axle torque exerted by the rotating blade. The robotic lawnmower 100 also has (at least) one battery 180 for providing power to the motors 150 and the cutter motor 165.

FIG. 2 shows a schematic view of a robotic working tool system 200 in one embodiment according to the teachings herein. The schematic view is not to scale. As in the prior art, the robotic working tool system 200 comprises a charging station 210 and a boundary wire 250 arranged to enclose a work area 205, in which the robotic lawnmower 100 is supposed to operate. A signal generator 240 possibly housed in the charging station 210 generates and transmits a control signal 220 through the boundary wire, thereby causing a magnetic field to be emitted by the boundary wire 250 which magnetic field corresponds to the control signal and ma be picked up by the sensors 170 of the robotic working tool. A guide wire 230 emitting a guide signal is also shown along with an F-field (F) for enabling a robotic working tool to find the charging station 210 without a wire, and a N field for enabling the robotic working tool to manoeuvre correctly on the base plate of the charging station for docking with the station.

Figure 3:
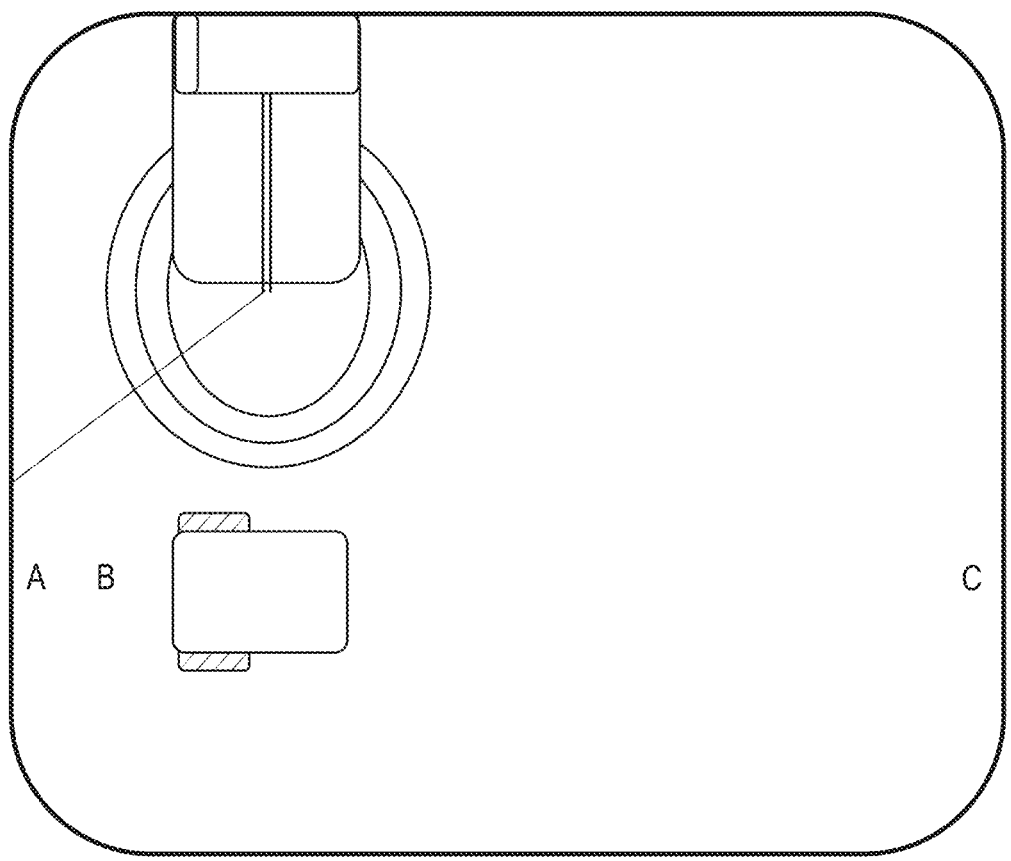
FIG. 3 shows a schematic overview of a robotic lawnmower system according to an embodiment of the teachings herein.
Figure 3:
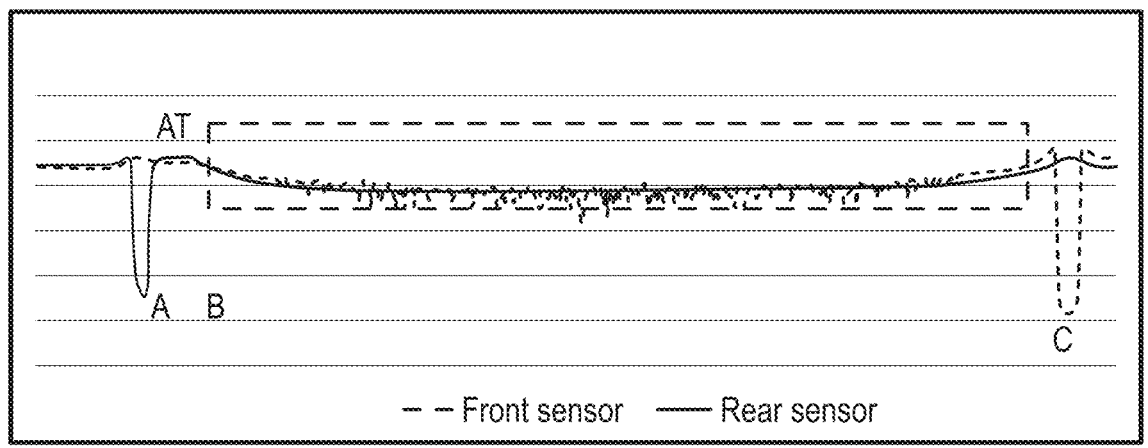

FIG. 3 shows a robotic work tool system 200 as in FIG. 2 along with a time graph of how the amplitude of the picked-up control signal varies, where the robotic working tool 100 is traversing the work area from one side to the opposite side. As the robotic working tool 100 moves from one end of the work area 205 to the opposite end, the signal strength of the picked-up signal varies as in the time graph. Assuming a constant speed, the graph may be seen as representing the signal strength of the picked-up signal at various locations of the work area 205.

As can be seen at point A, being close to the boundary wire 205, the signal strength is quite high and the picked up signals are clean only showing small fluctuations or variations due to internal interference. However, as can be seen at point B, being removed from the boundary wire (approximately in the middle of the work area 205), the signal strength of the picked-up signal is lower and the picked-up signals exhibit a greater variation due to the internal interference. As can be seen the variation can be relatively large and thus quite noticeable or detectable. Especially of a variable gain amplifier is used when the interference will also be amplified.

Due to the preferred construction and arrangement of control circuits, most control circuits are grouped together on a single (or at least a small amount) of control boards. As such, the internal interference will be strongest around such control boards, especially as they are usually mounted close to driving circuits and components for the wheels (battery, motor, etc). The internal interference a sensor is subjected to will thus depend on its placement in the robotic working tool, as the internal interference is proportional to the distance to such components (decreasing proportional to the inverse square of the distance). Also, the smaller the robotic working tool is, the greater the risk of non-insignificant interference.

The sensors will thus be affected differently by the internal interference. The robotic working tool of FIG. 3 has a front sensor 170' and a rear sensor 170" and the control circuits 110 are located in the front. The front sensor 170' will thus be exposed to a larger amount of internal interference, than the rear sensor 170". It should be noted that this arrangement is simply for illustrative purposes and many different variations and possibilities exist, the main feature of this being that the sensors are subjected to different amounts of internal interference. For example, should the motor and drive system be the cause of the greatest interference (or if the control board was placed at the rear), the rear sensor 170" would be the one experiencing the highest internal interference.

As can be seen in the time graph of FIG. 3, where the dashed line corresponds to the front sensor and the continuous line corresponds to the rear sensor, the front sensor is exposed to a lot more internal interference than the rear sensor, which is apparent in that the dashed line is not as smooth as the continuous line.

As the inventors have realized, there will in almost all constructions be one sensor that is less exposed to internal interference than the other sensors. The inventors have also realized the when multiple sensors are used, they are only or mostly used for enabling a more controlled operation in relation to a boundary (or guide) wire. This means that the individual differences between the sensors are not of high importance when the robotic working tool is not close to the boundary wire. Also, as the internal distance between sensors is much smaller than the distance from the sensor(s) to the boundary wire, these differences also become negligible when the robotic working tool is not close to a boundary wire.

Based on these realizations, the inventors are thus proposing the simple and elegant solution of focusing on the main task at hand when being removed from the boundary wire, namely to sense that the control signal is alive (active), and simply ignore those sensors suffering from interference (and providing uneven signals).

The controller is therefore configured to determine a signal strength of at least one of the picked up-signals, and based on the signal strength determine which sensor 170 or sensors 170', 170" to listen to, that is to accept input from for controlling the operation of the robotic working tool.

In one embodiment the controller is configured to determine that the signal strength of a picked-up signal is above a threshold value, and in response thereto accept picked-up signals as input from a first set of sensors, and if the signal strength of a picked-up signal is below the threshold value, only accept picked-up signals as input from a second set of sensors, where the second set of sensors may be a subset of the first set of sensors.

As the amplitude of the received or picked-up signal may vary due to interference, a simple determination above/below may result in many quick changes if the signal fluctuates. To avoid this the controller may perform the duration over time, that is the signal need be above or below the threshold for a given time period (such as 1 second, 0.5 seconds, 1.5 seconds, 2 seconds or up to 5 seconds) before switching which (subset of) sensor(s) to listen to. In one embodiment, the controller is configured to determine that the signal strength is above or below the threshold by determining that the signal strength has been above or below respectively the threshold for a period of time. In one such embodiment, the controller is configured to integrate the signal strength over a period of time and to determine if the integral corresponds to a signal strength integral being below or above respectively the threshold.

In one embodiment, the second set of sensors is the sensor (assumingly) having the least interference. In one such embodiment, this sensor may be specified in the operating instructions as a specific sensor. In an alternative or additional such embodiment, this sensor may be provided as input for specifying a specific sensor according to operator or operational preferences.

In an alternative or additional such embodiment, the sensor(s) experiencing the least interference may be provided by being determined through analysing the picked-up signals over a time period, for example during installation, or during the start of every run, or at intervals. The second subset will then comprise those sensor exhibiting the smoothest signals. In the example of FIG. 3 this would be the rear sensor 170". In this example, the first subset is thus the front and rear sensors 1701, 170" and the second subset is the rear sensor 170". Should the opposite be true, that the front sensor 170' experiences less interference than the rear sensor 170", the second subset becomes the front sensor 170'.

In one embodiment, the second set may comprise more than one sensor. In one embodiment, the second set comprise a single sensor.

In one embodiment, the controller may be further configured to compare the picked up signals to more than one threshold value.

In one such embodiment, the controller is configured to determine that the signal strength of a picked-up signal is below a second threshold value (being lower than the first threshold value), and in response thereto only accept picked-up signals as input from a third set of sensors, where the third set of sensors may be a subset of the second set of sensors.

In one embodiment, the controller may be further configured to adapt the acceptance of picked-up signals by weighting them differently depending on which set of sensors the corresponding sensor belong to, where a smaller subset is weighted higher or heavier than the sensors only being in an upper set.

This weighting may be stepwise based on the threshold values, it may be relative the picked up signal strength.

In an embodiment where the weighting is based on the threshold values, the weighting changes depending on how the picked-up signal compares (over/under) to the threshold values. For example, in one such embodiment, the weighting may be 100% if the signal strength is above the first threshold, the weighting may be 50% if the signal strength is below the first threshold, and 0% if the signal strength is below the second threshold.

In an embodiment where the weighting is based on the signal strength, the weighting changes depending on how the signal strength of the picked-up signal changes (increases/decreases). For example, in one such embodiment, the weighting may correspond to the quota of the picked up signals strength and the maximum signal strength.

Returning to the example of FIG. 3, the rear sensor 170" is the sensor that is furthest from the control circuits and thus the one that is exposed to the least internal interference, and is thus the one most trusted by the controller.

As the controller determines that the picked up signal strength falls below a threshold value, the controller starts ignoring the front sensor 170', as that sensor will now start to exhibit an irregular picked-up signal, that can not be trusted. As the robotic working tool 100 approaches the boundary wire on the opposite side, point C, the signal strength of the picked-up signal will again rise above the threshold value and the controller will again accept input from the front sensor, enabling the robotic working tool to navigate properly close to the boundary wire. The threshold value is indicated in FIG. 3 as AT (Amplitude Threshold) and the area where only input from the trusted sensor, the rear sensor 170", is accepted is indicated by the rectangle, marking a trusted zone.

In this example, the first set of sensors comprise the front and the rear sensors, and the second set solely comprise the rear sensor 170".

Although the subsets have been discussed as being subsets of one another, they may also have other relations to one another, such as being partially overlapping or even distinct.

The actual grouping of sensors depend on the operational preferences and the actual structure of the robotic working tool. The grouping may also depend on the control signal that is being picked up.

As is shown in FIG. 3, the charging station, carrying the signal generator in this example, does not only transmit a boundary wire control signal, but also at least one guide signal for enabling the robotic working tool to follow a guide wire, an F-field control signal for enabling the robotic working tool to find the charging station and an N-field control signal for enabling the robotic working tool to operate correctly in relation to the charging station.

As the inventors also have realized, the robotic working tool may be required to operate in a specific manner close to any of these sources, and the subset of sensors that is accepted may thus also depend on which control signals are picked up, at a given signal strength. For example, if the robotic working tool is far away from a boundary wire, the picked-up signal strength will fall below the threshold level and some sensors will be ignored. However, if the robotic working tool comes close to a guide cable, the robotic working tool may need to utilize the ignored sensors as well. The grouping may thus also be based on the signal being picked up. The grouping may also be dependent on the type of signal, wherein the controller is configured to listen to one subset of sensors for listening to one signal, and a second (possibly the same) subset of sensors for listening to a second signal.

Furthermore, the robotic working tool is unlikely to need to find the F-field until it needs to find the charging station to be recharged, or when a work session is over. As the use of multiple sensors will enable the robotic working tool to find the charging station more quickly, the F-field may be associated with a lower threshold than the boundary control signal, thereby starting to listen to both (all) sensors earlier, than if only going by the same threshold value. The threshold value may thus be associated with the type of control signal.

The threshold value may also be dependent on a task at hand. Should the robotic working tool need to recharge it should have a lower threshold for finding the F-field than if it does not need to recharge.

The threshold values may be given as exact values, or as relative values, based on the maximum detected signal strength during a time period.

Figure 4:
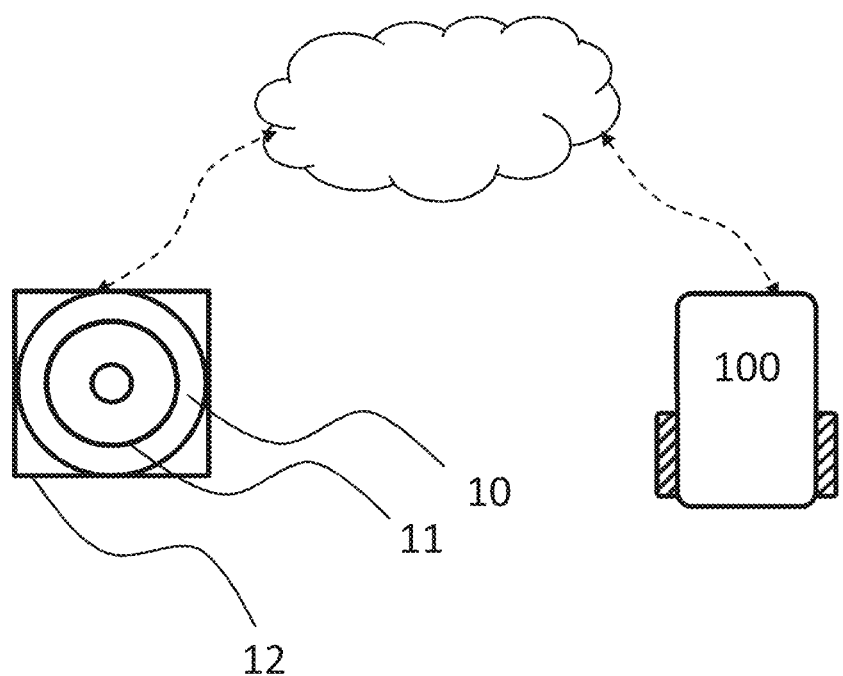
FIG. 4 shows a schematic view of a computer-readable medium carrying computer instructions according to an example embodiment of the teachings herein.

It should be noted that as the robotic working tool 100 already includes all or at least most hardware components necessary to detect and operate according to a trusted sensor, a simple software update may be sufficient to adapt an existing robotic working tool 100 to operate according to the teachings herein. Such software update may be provided by loading a set of computer instructions into the controller of the robotic working tool 100. Such computer instructions may be carried by a computer readable medium as shown in FIG. 4, which shows a schematic view of a computer-readable product 10 according to one embodiment of the teachings herein. The computer-readable product is configured to carry or store a computer program or computer program instructions 11 along with application related data. The computer-readable product 10 may be a data disc as in FIG. 4 or a Universal Serial Bus, a memory card or other commonly known computer readable products, these being examples of transitory mediums. The computer-readable product 10 may be inserted or plugged in or otherwise connected to a computer-readable product reader 12 configured to read the information, such as the program instructions 11 stored on the computer-readable product 12 and possibly execute the instructions or to connect to a device configured to execute the instructions such as a robotic working tool 100, as the one disclosed in FIGS. 1A and 1B. The robotic working tool 100 may thus connect wirelessly or through a wired connection to a computer-readable product reader 12 (this being an example of a non-transitory medium) to receive the computer instructions 11. In FIG. 4, the robotic working tool has connected wirelessly through a cloud service. The robotic working tool 100 may in one embodiment comprise the computer-readable product reader 12 to receive the computer instructions 11.

Figure 5:
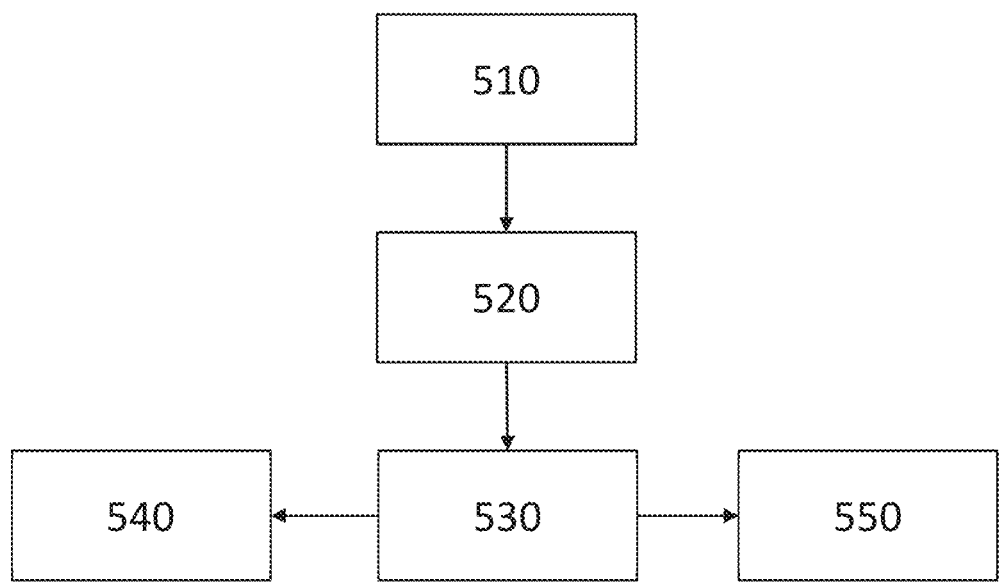
FIG. 5 shows a flowchart for a method for a robotic working tool according to an example embodiment of the teachings herein.

When loaded into and executed by a controller the computer instructions may cause the robotic working tool 100 to operate according to a method as shown in FIG. 5 which shows a flowchart for a general method for a robotic working tool according to herein. The robotic working tool 100 is thus configured to perform a method comprising detecting 510 a first magnetic signal, determining 520 a signal strength of the detected first magnetic signal and determining 530 if the signal strength of the detected magnetic signal is above or below a threshold value, and if the signal strength is above the threshold value, accepting 540 signal detection input for the first magnetic signal from a first set of sensors, and if the signal strength is below the threshold value, accepting 550 signal detection input for the first magnetic signal from a second set of sensors, wherein the second set of sensors is a subset of the first set.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A robotic working tool comprising a controller and at least a first magnetic sensor and at least a second magnetic sensor arranged to sense a magnetic signal, wherein the controller is configured to:
   detect a first magnetic signal via either of the first or the second magnetic sensors;
   determine a signal strength of the detected first magnetic signal;
   determine if the signal strength of the detected first magnetic signal is above or below a threshold value, and if the signal strength is above the threshold value, accept signal detection input for the first magnetic signal from a first set of sensors, and if the signal strength is below the threshold value, accept signal detection input for the first magnetic signal from a second set of sensors, wherein the second set of sensors is a subset of the first set of sensors.

2. The robotic working tool according to claim 1, wherein the first magnetic sensor is comprised in the second set of sensors, and the first magnetic sensor and the second magnetic sensor are comprised in the first set of sensors.

3. The robotic working tool according to claim 2, wherein the first magnetic sensor is a rear sensor disposed at a rear end of the robotic working tool, and the second magnetic sensor is a front sensor disposed at a front end of the robotic working tool.

4. The robotic working tool according to claim 1, wherein the controller is configured to accept input from a set of sensors by weighting the input according to the determined signal strength and according to which subset the sensor belongs.

5. The robotic working tool according to claim 1, wherein the controller is further configured to detect a second magnetic signal via either of the first or the second magnetic sensors and determine the signal strength for the second magnetic signal, and to determine if the signal strength of the second magnetic signal is above or below a second threshold value, and if the signal strength of the second magnetic signal is above the second threshold value, accept signal detection input for the second magnetic signal from the first set of sensors, and if the signal strength of the second magnetic signal is below the second threshold value, accept signal detection input for the second magnetic signal from the second set of sensors.

6. The robotic working tool according to claim 1, wherein the threshold value depends on the signal to be detected.

7. The robotic working tool according to claim 1, wherein the threshold value depends on a task to be performed.

8. The robotic working tool according to claim 1, wherein the threshold value is based on the detected signal strength.

9. The robotic working tool according to claim 1, wherein the controller is further configured to determine that the signal strength is above or below the threshold value by determining that the signal strength has been above or below respectively the threshold value for a period of time.

10. The robotic working tool according to claim 1, wherein the robotic working tool is a robotic lawnmower.

11. A robotic working tool system comprising the robotic working tool according to claim 1.

12. A robotic working tool comprising a controller and at least a first magnetic sensor and at least a second magnetic sensor arranged to sense a magnetic signal, wherein the controller is configured to:
    detect a first magnetic signal via either of the first or the second magnetic sensors;
    determine a signal strength of the detected first magnetic signal;
    determine if the signal strength of the detected first magnetic signal is above or below a threshold value, and if the signal strength is above the threshold value, accept signal detection input for the first magnetic signal from a first set of sensors, and if the signal strength is below the threshold value, accept signal detection input for the first magnetic signal from a second set of sensors, wherein the second set of sensors is a subset of the first set of sensors,
    wherein the first magnetic sensor and the second magnetic sensor are subject to both internal and external sources of signal interference,
    wherein the controller is further configured to determine which one of the first magnetic sensor and the second magnetic sensor is least affected by interference and set the one of the first or second magnetic sensors that is least affected by interference as being comprised in the second set of sensors.

13. A method for use in a robotic working tool comprising at least a first magnetic sensor and at least a second magnetic sensor arranged to sense a magnetic signal, the method comprising:
    detecting a first magnetic signal;
    determining a signal strength of the detected first magnetic signal;
    determining if the signal strength of the detected first magnetic signal is above or below a threshold value, and if the signal strength is above the threshold value, accepting signal detection input for the first magnetic signal from a first set of sensors, and if the signal strength is below the threshold value, accepting signal detection input for the first magnetic signal from a second set of sensors, wherein the second set of sensors is a subset of the first set of sensors.

14. A non-transitory computer readable medium storing computer instructions that when loaded into a controller of a robotic working tool, causes the robotic working tool to operate according to a method according to claim 13.

* * * * *